Dec. 31, 1968   J. P. CHISHOLM   3,419,865
MOBILE EMERGENCY UNIT LOCATING SYSTEM
Filed May 10, 1967
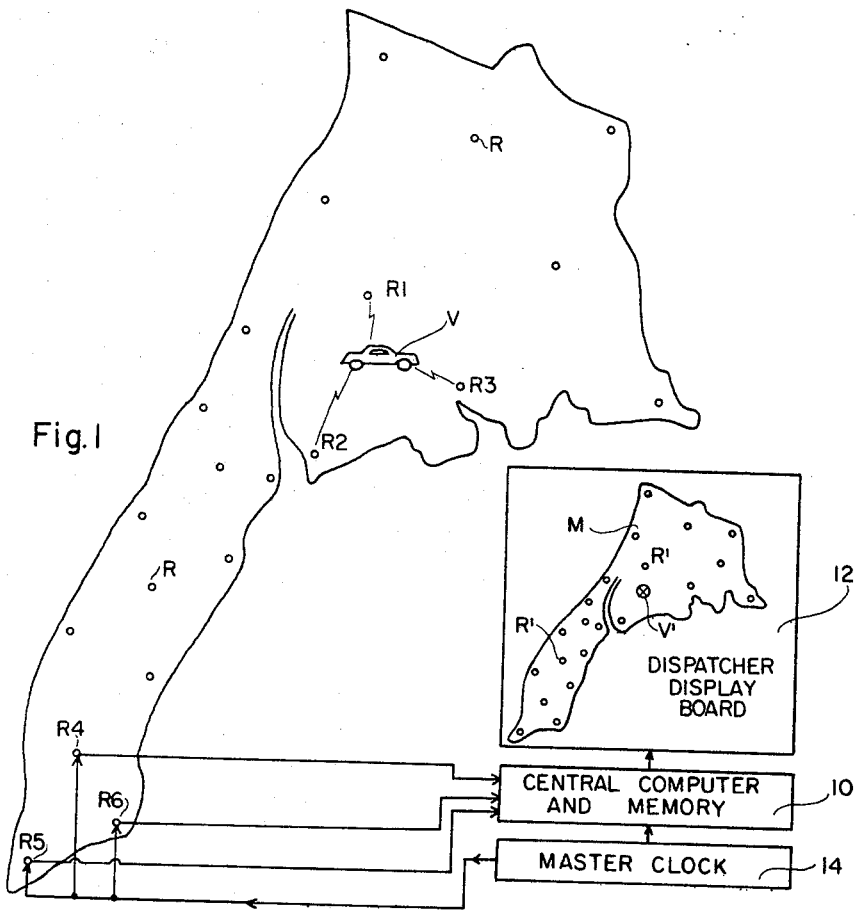
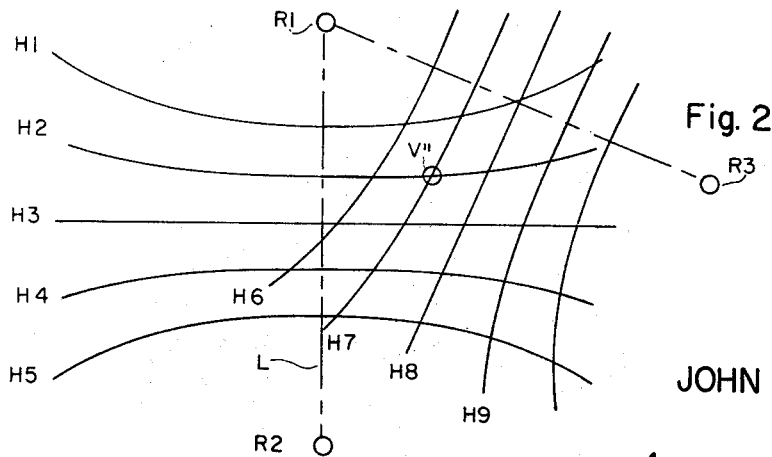
INVENTOR
JOHN P. CHISHOLM
BY Alexander & Powell
ATTORNEYS Dec. 31, 1968  J. P. CHISHOLM  3,419,865
MOBILE EMERGENCY UNIT LOCATING SYSTEM
Filed May 10, 1967  Sheet 2 of 3

INVENTOR
JOHN P. CHISHOLM

BY *Alexander & Powell*
ATTORNEYS

Dec. 31, 1968   J. P. CHISHOLM   3,419,865
MOBILE EMERGENCY UNIT LOCATING SYSTEM
Filed May 10, 1967   Sheet 3 of 3

INVENTOR
JOHN P. CHISHOLM

BY *Alexander & Dowell*

ATTORNEYS

United States Patent Office 3,419,865
Patented Dec. 31, 1968

3,419,865
MOBILE EMERGENCY UNIT LOCATING SYSTEM
John P. Chisholm, Rte. 1, Koloa Kauai, Hawaii 96756
Filed May 10, 1967, Ser. No. 637,501
8 Claims. (Cl. 343—112)

ABSTRACT OF THE DISCLOSURE

A system for continuously locating the positions of police cars or other special units in a metropolitan area and providing a continuous display of these locations for the purpose of showing the distribution of units, especially in the vicinity of a reported crime, the system including a plurality of receiver stations all synchronized to a common clock system; and each police unit being equipped with a pulse transmitter and a clock to actuate the local pulse transmitter during a unique time slot assigned to that unit; and all receivers delivering information to a central computer which determines the differences in times-of-arrival of the same pulse signal from a mobile unit and computes therefrom the position of the mobile unit by solving simultaneous hyperbolic relationships.

---

This invention relates to a system for continuously determining and displaying the location of each mobile police unit for the purpose of indicating their exact relative locations within a metropolitan area. For the purpose of effectively combating crime, it is especially important to apprehend the criminal during commission of the crime, rather than attempting to find the criminal once he has escaped. However, such apprehension of a criminal at the scene of a crime requires extremely efficient dispatching of mobile police units. It often occurs that the police dispatcher is only approximately informed of each mobile unit's location, namely that the unit is probably within the beat assigned to it. On the other hand, other units in adjacent beats may actually be closer to the scene of the crime. Moreover, some police units may already be busy and unable to leave situations they are currently investigating in order to respond to a new assignment at another location. The present system will greatly decrease the elapsed time between reporting of a crime and the arrival of one or more police units at the scene. Moreover, the present system will provide a dispatcher with the ability to closely follow a chase in which mobile units participate so that an escaping car can be more easily cut off by efficiently dispatching other units to close in and block the escape.

It is the principal object of this invention to provide a system for accurately locating a large number of mobile police units in a metropolitan area with a degree of accuracy which is at least capable of indicating the position of a car to an accuracy of less than one city block.

It is another major object of the invention to provide a system which updates its positional data with respect to each mobile unit at such a high rate that the unit can move only a very short distance before its position is again determined and displayed at the dispatcher's display unit, or units.

Still another important object of the present invention is to provide a system which identifies each unit whose location is determined, at least to the extent of identifying the time slot in which the unit transmits, which time slot is uniquely assigned to that unit.

It is a further object of this invention to provide a system having a number of receivers at fixed mutually-spaced locations, most of which receivers will be receiving signal pulses from the mobile police units, and will furnish time-of-arrival information to a central computer which will then compute and indicate the location of each mobile unit.

Another object of this invention is to provide a system in which the electronic equipment required in each mobile unit is simple and inexpensive, and in which the more complex equipment is associated with the fixed locations, which are every much fewer in number.

A further object of this invention is to provide a system in which all receiver units are synchronized with a common time clock or alternatively contain their own time clocks which are mutually synchronized. Since the computer determines the position of each mobile transmitting unit by the times-of-arrival of its transmission at plural receiver units, the receiver units must be accurately synchronized, for instance to an accuracy of less than one microsecond, so that the times of arrival at the various receivers can be accurately determined and relayed to the central computer. The accuracy of the clock in any mobile unit does not affect the accuracy with which the computer will determine the unit's location, and therefore, the synchronism of the mobile clocks need not be very accurate. The time clocks in the mobile units merely serve to maintain rough time-slot boundaries, which in turn serve to identify the unit uniquely transmitting in a particular time slot and avoid interference with other units' transmissions.

It is another object of this invention to provide a system employing a considerably larger number of spaced receivers at fixed locations than is necessary to actually determine the location of a unit. The cost of additional receiver locations is relatively small, especially considering that the receivers can be automatic unattended units connected to the computer using a binary code link via ordinary telephone lines, and this small additional cost is more than counterbalanced by the fact that a larger number of receivers provides redundancy which permits the computer to check the accuracy of its computations. The use of a larger number of receivers further enhances reliability, because it avoids loss of signal due to temporary masking of a transmission by a large building, and it provides more crossings of hyperbolic lines of position so that lines which mutually cross at angles approaching right angles can be selected by the computer and more heavily weighted in its computations.

It is another object of this invention to provide a system in which multipath propagation between a mobile transmitter and a receiver, due to reflection off of buildings and other objects can be prevented from causing confusion in the processing of the information, for instance by gating off each receiver after the reception of the first pulse and for a sufficient number of microseconds to permit multipath reflections to die out. The first pulse to arrive at a receiver has travelled the shortest path, and therefore provides the most accurate information concerning the distance of the transmitter from the receiver.

Still another object of the invention is to provide a system in which non-police conveyances such as taxis and buses can be provided with transmitters operable by concealed foot switches which can be actuated to furnish notice to a police dispatcher of a crime occurring at the present moment, for instance when the bus driver or taxi operator is being attacked, or sees a crime in progress on the street. The output of the emergency transmitter in the conveyance can be coded so as to provide it with a different identification than the police car identification which will thereby inform the dispatcher of the "alarm" nature of the signal, and since pulses from this transmitter will be received at multiple fixed receiver units, the computer will then determine the location of the attacked conveyance in the same way it determines a police car location. These pulses can be transmitted in the same frequency channel and interlaced with pulses from the police cars without confusing the computer system. The dispatcher can upon receipt of such an alarm immediately dispatch the closest mobile police unit to the scene of the crime with a very good chance of having the unit arrive before the criminal can escape.

It is another major object of this invention to provide a mobile-unit locating system of the type described which can perform all of its functions on a single frequency channel, can easily keep track of at least 1,000 mobile police units, will acquire position data from them many times per minute, and will locate their positions throughout the city within a relatively few feet, the system at the same time using very simple, reliable and inexpensive equipment in the mobile units.

Other objects and advantages of this invention will become apparent during the following discussion of the drawings, wherein:

FIG. 1 is a diagram showing a distribution of receiving stations within a metropolitan area and showing computer and display equipment locating a vehicle in the area;

FIG. 2 is a diagram showing three receiving positions uniquely determining the location of a vehicle whose signal is received thereby;

Figure 5:
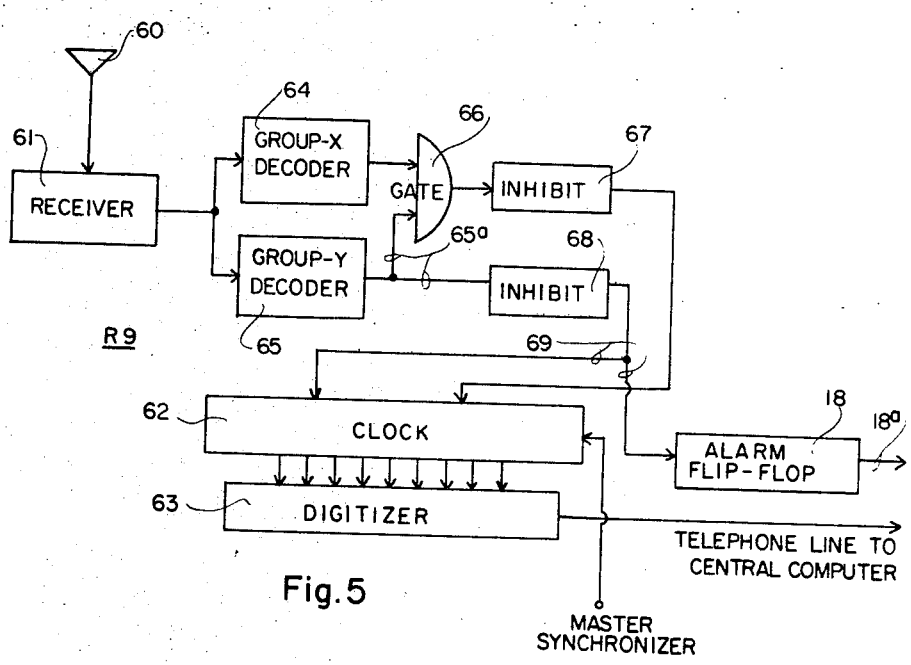
FIG. 5 is a block diagram showing one receiver location similar to a receiver location shown in FIG. 3, but equipped to distinguish between police units and other conveyances equipped to report emergencies.

Referring now to FIG. 1, this diagram shows twenty-one fixed positions distributed around an outline of a metropolitan area, New York in the present illustration. These various receiver positions are labeled R1, R2, R3, R4, R5, R6 . . . , and they represent at each position, for instance, the equipment clustered near one of the antennas to the left in FIG. 3, or the equipment as shown in FIG. 5. These receiver positions are connected in the manner shown near the bottom of FIG. 1 to provide an output to a central computer and memory system 10 which in turn displays computed locations of vehicles emitting signals on a display board 12 which board may conveniently be provided with an outline map M showing receiver positions R'. If the display is large enough, the roads within the area should also be shown on the map.

In FIG. 1, an equipped police vehicle V is shown emitting pulses which are received by a number of receivers including R1, R2, R3, but including also many other similar receivers. The vehicle V emits pulses at spaced intervals, and the receivers R1, R2, and R3, and others, informed the computer via land wire of the precise moments at which they received the pulses emitted by the vehicle V. There is no need to know the absolute time at which each station received the pulse, but it is necessary to know the exact difference in time between the moments at which the pulses were received at the reported receivers. Therefore all of the receivers R are synchronized to a common time clock labeled master clock 14 in FIG. 1. This master clock, in the illustrated example, synchronizes all of the receivers to within a time differential not exceeding one-half microsecond, and therefore each receiver can report to the computer a time reading determined by its local synchronized clock, by which the computer can determine a point V' on the map M which is a unique solution to the problem of the vehicle's location, this unique solution satisfying inputs from all receivers. It should be understood that more than three receivers will report the times-of-arrival of the vehicle's pulse.

Referring now to FIG. 2, this figure shows three receiving stations R1, R2, and R3, and also shows some lines of location which are hyperbolically interrelated. For example, considering only receivers R1 and R2, the hyperbolic lines H1, H2, H3, H4, and H5 represent a family of curves indicating possible locations of the vehicle. If receivers R1 and R2 simultaneously receive the pulse from the vehicle V, then it must be located somewhere on line H3, which is a straight line normal to the center line L between R1 and R2 and bisecting it. On the other hand, if the two receivers R1 and R2 report that R2 received the pulse first, then the vehicle must be located on one of the lines H4 or H5 depending upon how great a time differential existed between the arrival of the vehicle's pulse at R2 and the subsequent arrival thereof at R1. In the illustrated case, it is assumed that the vehicle is located nearer R1 than R2, and therefore it will appear on hyperbolic line H2. This information provides a line of position for the vehicle, but not an exact location on that line.

Therefore, a third receiver R3 is used to resolve the line of position into a single point V''. This is accomplished by determining, as a result of measuring the time-of-arrival at R3 and R1 of the vehicle's signal, that the difference in arrival time of the two signals places the vehicle on the hyperbolic line H7. The crossing of the line H7 and the line H2, uniquely determines the point V'' defining the vehicle's position. This point can further be checked by providing a family of hyperbolic curves as between R2 and R3 and determining which hyperbolic line of position in this family the vehicle must occupy. This third receiver line should also cross H2 and H7 at the point V''.

These computations are made by the central computer 10 for the outputs of all receivers reporting reception of the vehicle's pulse, and therefore great redundancy is provided for the purpose of checking the vehicle's position with accuracy. The solving of these simultaneous hyperbolic equations is a prior art function of computers, and requires no further elaboration.

As pointed out above, the determination of the vehicle's location is made solely by determining the times-of-arrival of its pulse signal at each of a plurality of receiving locations distributed around the metropolitan area. These receiving locations must be synchronized with great accuracy in view of the fact that errors in their time bases appear in the system directly as errors in the vehicle's position. While it is possible to provide time clocks with tremendous accuracy at each receiving station, for instance using atomic clocks, such provision is very expensive, and would tend to limit the number of receiving locations in a practical system. On the other end, clock synchronization is easily attained in the present situation because the positions of all receivers are fixed and known, and therefore the transit time from a central master clock 14, FIG. 2, to each receiving station such as R1, R2 and R3 is constant and can easily be compensated out. Therefore, it is satisfactory to equip each receiving station with a crystal-controlled oscillator of good stability, and use its output to drive a chain of counters in a manner well-known per se to provide a clock. The clock at receiver R1 is labeled 20, and this clock can be considered accurate over substantial periods of time measured in terms of milliseconds, or even seconds. In the illustrated embodiment this clock, and the clocks 22, 24, etc. contained in receivers R2, R3, etc., are periodically reset or synchronized to the master clock 14. The master clock delivers an output on wire 14a, which may alternatively comprise a radio link to the various receiver units, and this output is delivered to the various clocks through time-delay circuits 21, 23, and 25 which are adjusted to introduce amounts of delay suitable to compensate for the difference in transit times of the synchronizing signals from the central master clock 14 to the various local receiver clocks. Once these delays have been compensated, they should require little or no further attention since the transit time between the master clock and the various receivers does not change. Thus, at regular intervals the master clock can send out a synchronizing signal to all receiver locations adjusting their time clocks 20, 22, 24 to precise mutual synchronization. This can be done most easily by simultaneously resetting all of the counter chains in the various receiver clocks to zero count, or some other convenient count.

When a signal is received on an antenna 30, 32, 34, etc., the signal is delivered to a receiver 31, 33, 35, etc., where it is demodulated to recover the envelope of the vehicle's pulse, this envelope being quite rectangular. It is then delivered to an inhibit circuit 36, 37, 38, etc., which serves the purpose of passing the first demodulated signal to arrive, but blocking all other subsequent pulses which are the result of multipath propagation, for the purpose to be hereinafter more fully discussed. Thus, the inhibit gate passes the first signal to arrive from the vehicle, delivering it for instance along the wire 39 to the clock 20, and causes the clock to read out the instantaneous count of its counter to a digitizer circuit 40. The digitizer then encodes the clock reading at the moment of reception and delivers the appropriate code group through the wire 42 to the central computer 10. In a similar way, the digitizer 41 encodes the reading of its clock 22 and delivers it through the wire 43 to the computer. Likewise the digitizer 44 reads out the reading of its associated clock 24 through the wire 45 to the computer 10. These digitizers are equipped to deliver an output code of such a nature that it can be transmitted over ordinary telephone lines 42, 43, 45 . . . to the central computer, thereby avoiding the necessity of using special high-frequency cable interconnections, or radio links, such as would be required if the pulse output of each receiver were delivered directly to the computer.

However, the latter system is also to be considered within the scope of this invention, and might prove economical in metropolitan areas where such cables are available or easily provided. If the receiver's output could be read directly into the central location of the computer, then no local clocks or digitizers would be necessary, and the outputs of the receivers could be delivered through compensating delay lines provided for the purpose of obviating the difference in distance of the various receivers from the central computers.

Figure 4:
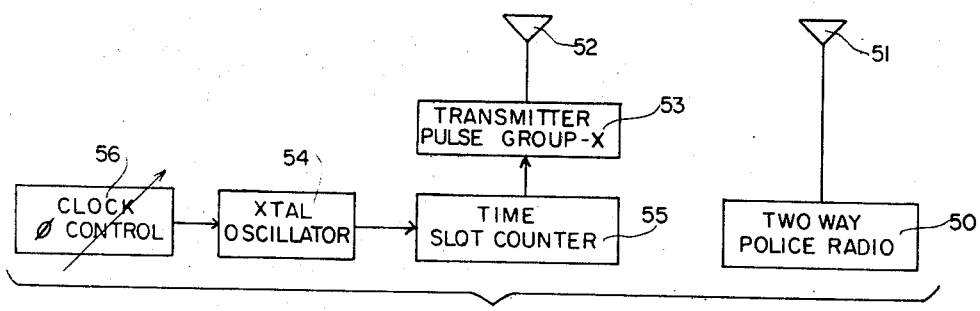
FIG. 4 is a block diagram showing mobile electronic equipment within a police vehicle according to the present invention.

FIG. 4 shows a practical installation of equipment for use in a police vehicle. A two-way police radio 50 and antenna 51 are illustrated in FIG. 4 because they are standard equipment in police cars, and can be used for a useful purpose to be hereinafter discussed. The police vehicle equipped according to the present disclosure also includes an antenna 52, which can be combined with the antenna 51 using suitable network means, and the equipment within the vehicle further includes a pulse transmitter 53. In view of the fact that other pulses may be received by the receiver units R1, R2, R3 . . . from spurious sources, it is desirable to have each transmitter 53 deliver a characteristic signal in the form of a coded pulse group, for instance two one-microsecond pulses spaced by a one microsecond separation. Each receiver can then be provided with a pulse group decoder, which will be further discussed in connection with FIG. 5, for the purpose of definitely identifying received pulses as being signals from a FIG. 4 unit contained within a police vehicle.

Thus far, the system has been described as though there were only one mobile unit involved. Whenever there are many such units in operation, it is desirable to avoid interfering transmissions which would tend to confuse the unique location of each unit as previously mentioned in connection with FIG. 2. Moreover, it is desirable to be able to identify uniquely the various vehicles whose positions are displayed on the board 12. Both of these purposes are well served by providing cyclically recurring time slots in which each vehicle may perform without interference from any other vehicle, and which time slots are uniquely assigned to the various vehicles to assist in their separate identifications as hereinafter described.

For the sake of illustration, suppose that there is a time slot for each vehicle, and each time slot is 5,000 microseconds in duration. A counter chain 16, FIG. 3, can be driven by the master clock 14 and will keep track of the various time slots assigned to the various units. If there are 1,000 vehicles involved, each assigned to operate within a 5,000 microsecond time slot, each frame including a complete cycle of time slots will be 5 seconds in duration, meaning that the position of each vehicle will be redetermined every five seconds. This is a very reasonable rate of data acquisition since a vehicle travelling at 30 miles an hour will move only 220 feet during each five-second frame.

On the other hand, the vehicle itself must be capable of keeping track of the time slot assigned to it during which it must transmit and have its location determined. The travel time of a pulse is about six microseconds per mile, and therefore an entire metropolitan area will be traversed in considerably less than 100 microseconds by any pulse emitted within that area. Therefore, to remain within an assigned time slot, assuming that the vehicle's clock was initially set to actuate its transmission at the very center of its time slot as will be the case immediately after synchronizing of its clock, i.e., 2500 microseconds after commencement of the time slot, the vehicle's local clock including the oscillator 54 and counter 55 can from then on be permitted to drift as much as about 2400 microseconds in either direction and still not run the risk of interferring with a time slot assigned to another vehicle. For this purpose, a crystal oscillator 54 having a stability of one part in $10^7$ can drift for 400 minutes before it will be in danger of exceeding the 2400 microsecond permissible error. Thus, such a time clock would require resetting only every six hours or so, and this would be almost long enough to cover one complete assignment or beat without requiring resynchronization. A more expensive clock, driven by an oscillator having a one-part-in-$10^8$ stability would be more than adequate to perform for a full eight hours without resynchronization.

As mentioned above, each police car has a two-way radio 50, and clock synchronizing instructions can therefore be verbally delivered to each vehicle from time to time as may be needed, thereby permitting an officer riding in the car to make a manual adjustment by turning a dial on a clock phase control device 56. Such manual adjustment of the clock is desirable, since it eliminates the need for automatic receiving and adjusting equipment in each vehicle, thereby making the entire cost of the extra equipment to be added to each vehicle according to the present invention very low. This clock phase-adjustment information can be furnished by the computer whenever the moment of pulse-signal reception from a vehicle begins to approach the boundary of the assigned time slot. For instance, the computer 10 in FIG. 3 can be provided with an "early-late" indicating device 10b, for example in the form of lights on the front panel which will indicate excessive shifting of the phase position of a particular vehicle's clock with respect to its own time slot when the operator selects that time slot and momentarily disables the display of signals relating to all other slots. Means for making such a selection would include a manual selector 16a for selecting the display of information relating to only one time slot, or perhaps several selected time slots. This manual selector 16a also provides a satisfactory way of identifying a single police unit, namely by selecting the display of information relating to its own time slot to the momentary exclusion of all other time slots.

In view of the fact that transmissions from various vehicles may from time-to-time fail to be received by some of said receivers, for instance because of masking by large buildings, it is desirable to include memory capability within the central computer 10 so that it can remember for an interval of time the most recent data received as to the location of a vehicle. Thus, if a signal from the vehicle V is received by receivers R1 and R3, but not R2, a line of position can be established and stored. If a vehicle signal is subsequently received by R1 and R2, but not R3, then the computer using its memory can determine the position of the vehicle with a reasonable degree of accuracy by using the recently received data plus the stored line of position as determined by information from the first two receivers. The vehicle will move only a short distance during this interval of time between the computation of the two sequentially determined lines of position. Another useful function of the memory would be to retain information showing the last-known position of a vehicle whose transmission suddenly ceases, perhaps due to an accident or to an encounter with criminals.

Figure 3:
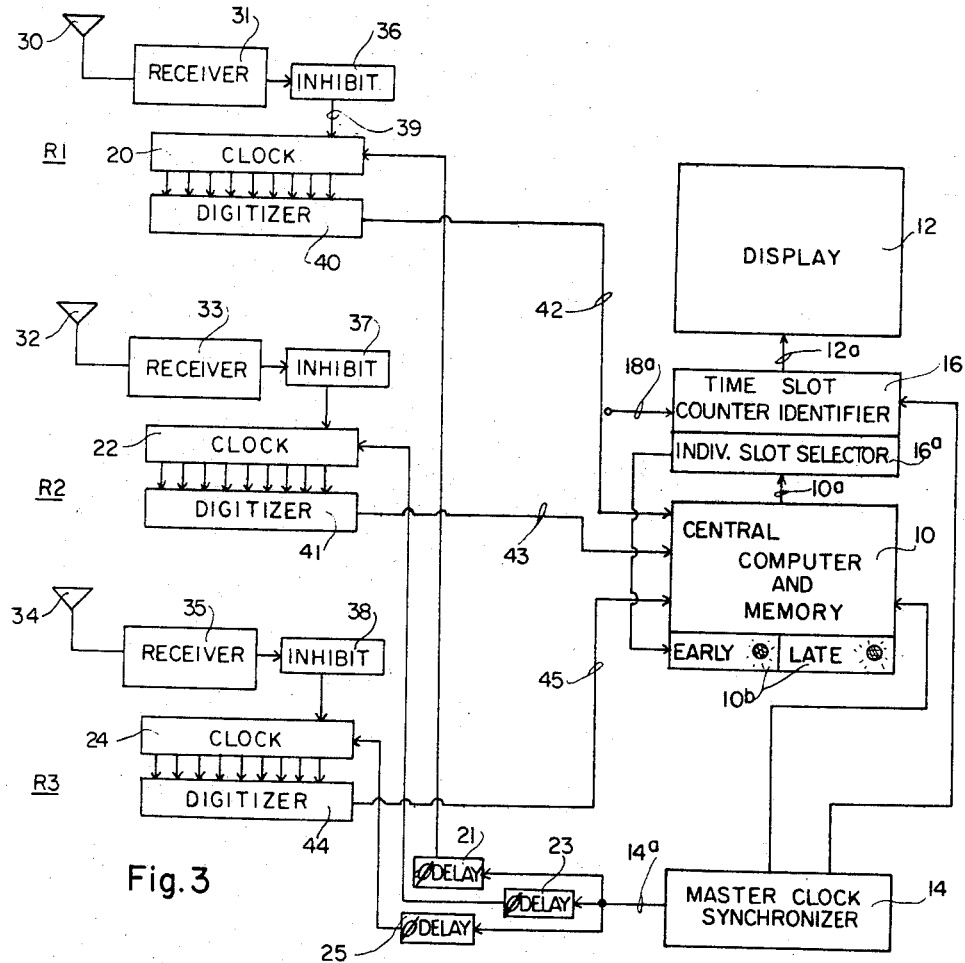
FIG. 3 is a block diagram showing a synchronized receiving and display system.

FIG. 5 shows a fragment of a system, similar to that shown in FIG. 3, in which a more sophisticated receiver capability is provided so that conveyances other than police vehicles can report a crime and/or the need for police assistance using the presently proposed system. FIG. 5 shows a single receiving position labeled R9 and having an antenna 60, a receiver 61, a clock 62 and a digitizer 63, all similar to corresponding units shown in FIG. 3 in connection with receiver positions R1, R2, and R3. Since it is desirable for a dispatcher to be able to distinguish between police units and other conveyances, the present disclosure provides that each police unit will transmit its signal in the form of a coded pulse group X. Other conveyances can then be made to transmit in the form of a differently coded pulse group Y using the mobile equipment shown in FIG. 6.

Figure 6:
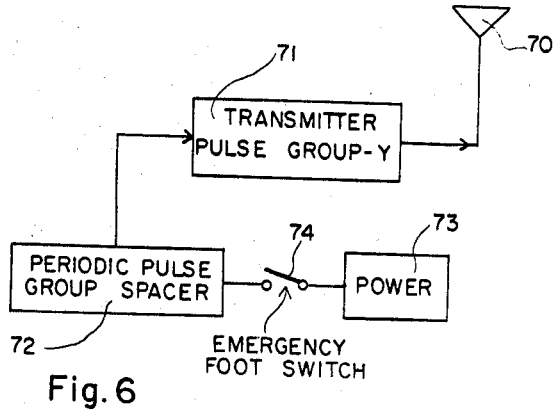
FIG. 6 is a block diagram showing emergency equipment suitable for installation in buses and taxis.

The circuit shown in FIG. 6 is to be included for instance in taxi cabs and buses, and perhaps in other conveyances as well. Since these conveyances would not normally be continuously located by the present system, their units can be simpler. Each includes an antenna 70, a transmitter 71 for transmitting code Y pulses, and some simple cyclic initiator such as a periodic pulse spacer 72. This system is connected to a power supply 73 through a foot switch 74 concealed in the vehicle so that the operator can activate the switch 74 in the event he is attacked.

The difference between code X and code Y pulses can be based upon a change in the number of pulses in a group, the widths thereof, or their mutual spacings. It is only intended that the codes be capable of indicating to the central system whether the signals are from a police unit or from a taxi or bus. At any rate, the output of the receiver shown in FIG. 5 is delivered to two separate decoders, including the decoder 64 for group X pulses and decoder 65 for group Y pulses. The outputs of these two decoders are delivered to a gate 66 which normally conducts the output from decoder 64. This output goes to an inhibit circuit 67 which serves the same purpose as the inhibit circuit 36 in FIG. 3, namely to block the receiver for a certain length of time after the first pulse signal is received in each time slot to let multipath pulses subsequently arriving die out before the receiver system again becomes responsive to another signal. This much of the receiver system of FIG. 5 operates normally in the same way as the receivers R1, R2, R3 . . . shown in FIG. 3. However, when a group Y signal is decoded in the decoder 65 its output on wires 65a will block the "or" gate 66, so that no group X signal can pass through the gate 66.

Suppose that the emergency transmitting system shown in FIG. 6 is adjusted to radiate pulse groups Y at the rate of 10 groups per second, the inhibit circuit 68 should be adjusted to block the output of the receiver for a little less than $\frac{1}{10}$ of a second. Thus, there would be signals appearing on the wires 69 which would actuate the clock 62 and digitizer 63 to read out the times of arrival of the emergency signals to the central computer, thereby indicating the position of the conveyance requiring help. The appearance of the emergency signal on the wire 69 can be used to actuate an alarm flipflop 18 connected by a wire 18a to the time slot counter and identifier 16 for the purpose of disabling all police car signals arriving in the time slots and momentarily preventing their display on the board 12, whereby only the conveyance requiring assistance will appear thereon. The dispatcher can immediately determine its position, and then manually reset the alarm flipflop 18 to permit resumption of police car location by the system. There are, of course, many other ways in which the occurrence of an emergency signal can be identified and its position shown in the display board either with, or separately from, the locations of police units.

One important advantage of the present system is that all functions can be performed using only a single frequency channel, for example somewhere in the range of 150 to 1500 mHz. A frequency of around 450 mHz. would be ideal for the present purpose, and a power output of about 10 watts should prove quite adequate for the police car pulses.

There are also many different ways in which the time of arrival can be measured with accuracy. For instance, it is useful to have a system in which the various receivers are never synchronized with complete accuracy, but instead the central computer system occasionally interrogates each receiver station and receives a transponse therefrom indicating the beginning of a locally measured time interval. When the reply is received at the computer from the various receiver stations, the computer will store the times of arrival thereof, check them against the known moments in the local sequence at which the receiver installation should have replied, and determine therefrom the clock setting at each receiver. These actual settings could then be stored and used to correct subsequently transmitted times-of-arrival of signals from that particular receiver. In other words, instead of setting the clocks in each receiver to synchronism, the computer would determine the local clock setting error, compensate at the computer for such error, and then adjust signals received from the receiver to include the error introduced by its local clock. In any event, it is important to emphasize that only the receiving system clocks affect the accuracy with which range is determined. The vehicle clocks merely serve to keep transmissions from the vehicles within the time slots assigned.

The present invention is not to be limited to the exact form shown in the drawings for obviously changes may be made within the scope of the following claims.

I claim:

1. A system for establishing and indicating the location in a metropolitan area of plural mobile units each of which is assigned one of a series of time slots counted out by a central fixed system, comprising:

(a) mobile system components including in each unit transmitter means for emitting pulse signals, timing means for roughly identifying the assigned time slot and connected to periodically actuate said transmitter means there during, and means for receiving early/late indication from said fixed system for correcting the timing means accordingly; and (b) fixed system components including means for counting out said time slots, at least three receivers spaced at fixed positions in said area and tuned to receive said pulse signals, highly accurate time clock means connected with said receivers to determine the relative times-of-arrival at the different receivers of pulse signals transmitted by the individual units, computer means connected to receive said relative times-of-arrival and computes locations of the units uniquely established by said relative times-of-arrival, and means for determining when the signals arriving in each time slot are early or late and for indicating early/late conditions to the mobile units for correction of their timing means.

2. The system as set forth in claim 1, for locating police units and also other equipped conveyance, comprising in each of said other conveyances a pulse transmitter; normally inoperative transmitter actuator means for initiating pulse signal transmissions at a repetition rate which is high as compared wit hthe rate of transmission from a police unit; and switch means for rendering aid actuator means operative in case of an emergency.

3. In a system as set forth in claim 2, first encoder means in each police unit for encoding the pulse signal transmission thereof, second encoder means in each of said conveyances for encoding the pulse signal transmission therefrom with an emergency code differing from code of police units; and decoder means included in said fixed components for distinguishing received signals according to said codes.

4. In a system as set forth in claim 3, alarm means at said display means and connected to be operated when an emergency-coded signal is received.

5. In a system as set forth in claim 1, each unit having means for communicating with said fixed system including a two-way radio comprising said means for receiving said early/late indications, and the timing means in each unit comprising a local clock having means for adjusting in time the position in the slot during which it actuates the associated transmitter means to transmit signals.

6. A system for establishing and indicating the location in a metropolitan area of plural mobile police units and other equipment conveyance units comprising:
 (a) mobile system components including in each police unit transmitter means for emitting pulse signals, and including timing means connected to periodically actuate said transmitter means;
 (b) other mobile system components comprising in each of said other conveyance units a pulse transmitter; normally inoperative transmitter actuator means for intiating pulse signal transmission at a repetition rate which is high as compared with the rate of transmissions from a police unit; and switch means for rendering said actuator means operative in case of an emergency; and
 (c) fixed system components including at least three receivers spaced at fixed positions in said area and tuned to receive said pulse signals, and including highly accurate time clock means connected to determine the relative times-of-arrival at the different receiver means of pulse signals transmitted by the individual units, and including computer means connected to receive said relative times-of-arrival and compute locations of the units uniquely established by said relative times-of-arrival, and including means for displaying said computed locations with reference to the receiver positions in said metropolitan area.

7. In a system as set forth in claim 6, first encoder means in each police unit for encoding the pulse signal transmission thereof, second encoder means in each of said conveyance units for encoding the pulse signal transmission therefrom with an emergency code differing from code of police units; and decoder means included in said fixed components for distinguishing received signals according to said codes.

8. In a system as set forth in claim 7, alarm means at said display means and connected to be operated when an emergency-coded signal is received.

References Cited

UNITED STATES PATENTS

| | | | |
|---|---|---|---|
| 2,422,122 | 6/1947 | Norton | 343—114.5 |
| 3,068,473 | 12/1962 | Muth | 343—112 |
| 3,167,772 | 1/1965 | Bagnall et al. | 343—112 |

RODNEY D. BENNETT, *Primary Examiner.*

RICHARD E. BERGER, *Assistant Examiner.*

U.S. Cl. X.R.

340—24